(12) United States Patent
Lee et al.

(10) Patent No.: US 12,487,153 B2
(45) Date of Patent: Dec. 2, 2025

(54) DEVICE FOR REMOVAL OF EXCESS MATERIAL FROM A TEST SAMPLE

(71) Applicant: TA Instruments-Waters LLC, New Castle, DE (US)

(72) Inventors: Reginald Lee, West Chester, PA (US); Peter Foster, Avondale, PA (US); Alina Latshaw, Glen Mills, PA (US); Sally Childears, Dover, DE (US)

(73) Assignee: TA Instruments-Waters LLC, New Castle, DE (US)

( * ) Notice: Subject to any disclaimer, the term of this patent is extended or adjusted under 35 U.S.C. 154(b) by 421 days.

(21) Appl. No.: 18/079,314

(22) Filed: Dec. 12, 2022

(65) Prior Publication Data

US 2023/0184638 A1   Jun. 15, 2023

Related U.S. Application Data

(60) Provisional application No. 63/289,515, filed on Dec. 14, 2021.

(51) Int. Cl.
*G01N 1/28* (2006.01)
*B26D 1/15* (2006.01)

(52) U.S. Cl.
CPC ............. *G01N 1/286* (2013.01); *B26D 1/15* (2013.01); *G01N 2001/2873* (2013.01)

(58) Field of Classification Search
CPC .......... B26D 1/44; B26D 1/15; B29C 43/361; B29C 2043/3618; B29C 2043/3621; B29C 2043/3626; B29C 2043/3628
See application file for complete search history.

(56) References Cited

U.S. PATENT DOCUMENTS 415,477 A * 11/1889 Stevens .................. B23D 21/14
                                                    83/685
612,955 A * 10/1898 Morris ................. B26D 1/0006
                                                    83/613

(Continued)

FOREIGN PATENT DOCUMENTS

CN   210043185 U   1/2020
CN   215492978 U   1/2022

(Continued)

OTHER PUBLICATIONS

International Search Report and Written Opinion in PCT/US2022/052527 mailed on Apr. 12, 2023.

(Continued)

*Primary Examiner* — Emmanuel S Luk
(74) *Attorney, Agent, or Firm* — Schmeiser, Olsen & Watts LLP; William G. Guerin, Esq.

(57) ABSTRACT

Described is a device for removal of excess material from a test sample. The test sample may be used in an instrument for measurement of rheological and mechanical properties sample properties. The device includes a test geometry and a trimming ring. The test geometry includes a lower geometry and upper geometry each having a circular outer edge and being centered on an axis of rotation. The trimming ring has a sidewall, a ring axis coincident with the axis of rotation and at least one cutting edge disposed along at least a portion of a circumference of the trimming ring at a diameter that is at least as great as a diameter of one or both the lower geometry and the upper geometry. The device further includes an actuator coupled to the trimming ring and configured to translate the trimming ring in a direction parallel to the axis of rotation.

17 Claims, 15 Drawing Sheets

(56) References Cited

U.S. PATENT DOCUMENTS

| | | | | |
|---|---|---|---|---|
| 2,045,471 | A * | 6/1936 | Kasen | B29C 43/00 264/209.3 |
| 2,251,135 | A * | 7/1941 | Iknayan | B26F 1/02 83/52 |
| 2,773,549 | A * | 12/1956 | Legarra | B26F 1/44 83/124 |
| 3,831,236 | A * | 8/1974 | Coburn | B26D 1/44 407/53 |
| 4,281,546 | A * | 8/1981 | Fraleigh | G01N 1/04 264/153 |
| 4,374,795 | A * | 2/1983 | Keilp | G11B 5/84 425/510 |
| 4,584,882 | A | 4/1986 | Tosaki | |
| 4,664,004 | A * | 5/1987 | Randall | B26D 7/30 83/919 |
| 4,711,115 | A * | 12/1987 | Sukonnik | B21D 28/26 72/47 |
| 5,251,351 | A | 10/1993 | Klotz | |
| 6,401,510 | B1 * | 6/2002 | Morse | B26F 1/40 83/621 |
| 7,047,794 | B2 | 5/2006 | Hajduk et al. | |
| 8,061,240 | B2 | 11/2011 | Hohensinner et al. | |
| 10,337,972 | B2 | 7/2019 | Meng et al. | |
| 2002/0194900 | A1 | 12/2002 | Hajduk et al. | |
| 2003/0024302 | A1 | 2/2003 | Hajduk et al. | |
| 2003/0029229 | A1 | 2/2003 | Hajduk et al. | |
| 2003/0033860 | A1 | 2/2003 | Hajduk et al. | |
| 2003/0111747 | A1 * | 6/2003 | Chiu | B29C 43/021 264/1.32 |
| 2004/0093932 | A1 | 5/2004 | Hajduk et al. | |
| 2007/0256507 | A1 | 11/2007 | Morgan | |
| 2009/0272178 | A1 | 11/2009 | Hohensinner et al. | |
| 2016/0324787 | A1 * | 11/2016 | Saur-Brosch | A61K 9/2095 |
| 2016/0354846 | A1 * | 12/2016 | Heffernan | B26F 1/16 |
| 2017/0030808 | A1 * | 2/2017 | Bovée | G01N 1/08 |
| 2017/0108422 | A1 | 4/2017 | Meng et al. | |
| 2017/0312929 | A1 * | 11/2017 | Zhu | B26D 3/11 |
| 2022/0381664 | A1 | 12/2022 | Solanki et al. | |

FOREIGN PATENT DOCUMENTS

| | | |
|---|---|---|
| EP | 0248460 A2 | 12/1987 |
| EP | 1178298 A2 | 2/2002 |
| JP | 2001299649 A | 10/2001 |
| WO | 2006021808 A2 | 3/2006 |

OTHER PUBLICATIONS

"HTR: High-Throughput Rheometer" Donau Lab SRL, 2021, https://donaulab.md/HTR-High-Throughput-Rheometer.

Freisinger, Robert and Dr. Jorg Lauger, "High-Throughput Experimentation in Rotational Rheology," 40th Annual Waterborne, High-Solids, and Powder Coatings Symposium, Feb. 4-8, 2013. https://www.pcimag.com/articles/97680-high-throughput-experimentation-in-rotational-rheology.

Cardinaels, et al. "Quantifying the errors due to overfilling for Newtonian fluids in rotational rheometry," Rheologica Acta vol. 58, pp. 52X 538 (2019). https://link.springer.com/article/10.1007/s00397-019-01153-z.

Lauger, Jorg and Michael Krenn, "From Sample Changer to the Robotic Rheometer: Automation and High Throughput Screening in Rotational Rheometry," AIP Conference Proceedings 1027, 1198 (2008) https://aip.scitation.org/doi/10.1063/1.2964515.

International Preliminary Report on Patentability in PCT/US2022/052527 mailed on Jun. 17, 2024.

International Search Report and Written Opinion in PCT/US2025/026458 mailed on Jul. 14, 2025.

* cited by examiner

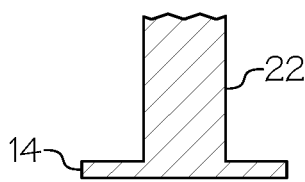
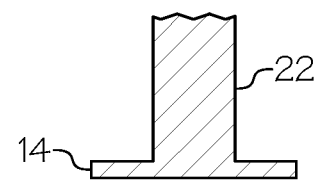
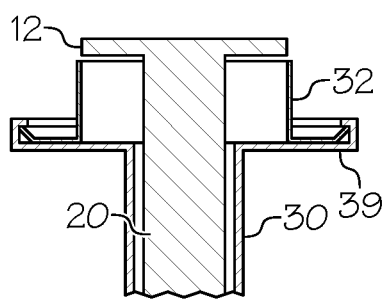
FIG. 4A
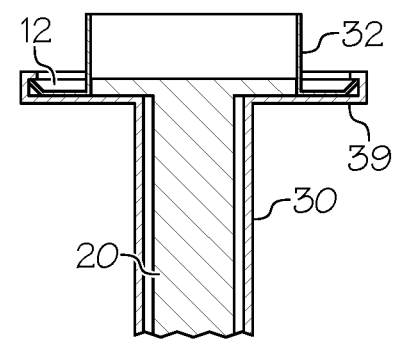
FIG. 4B
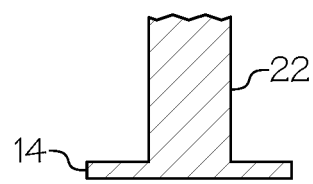
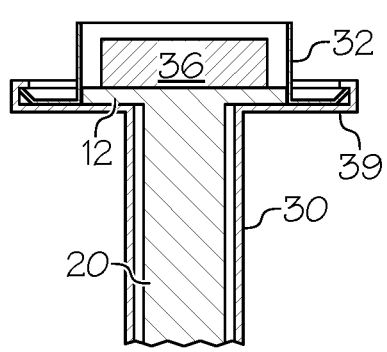
FIG. 4C
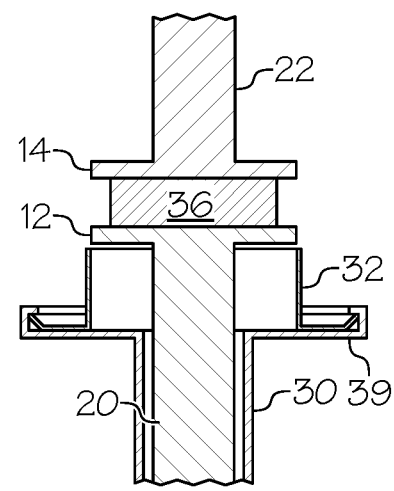
FIG. 4D

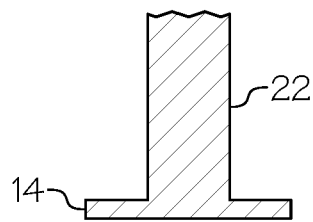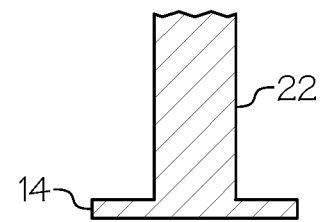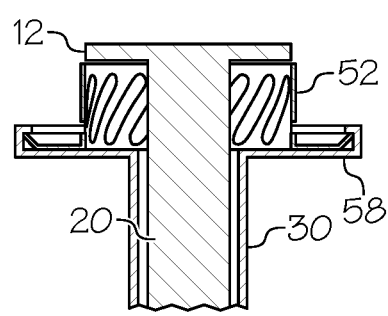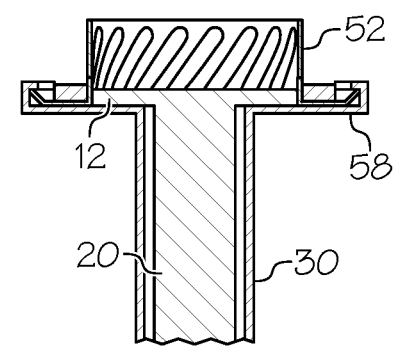
FIG. 8A FIG. 8B
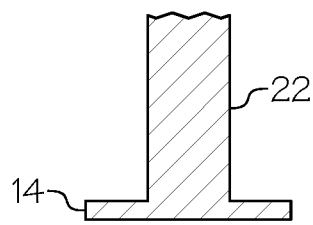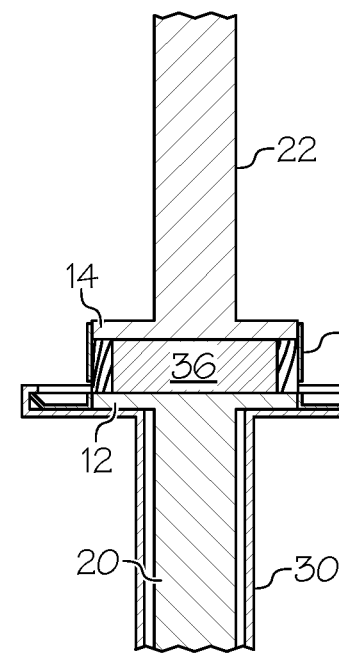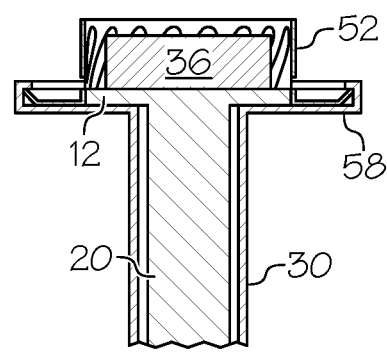
FIG. 8C FIG. 8D

DEVICE FOR REMOVAL OF EXCESS MATERIAL FROM A TEST SAMPLE

RELATED APPLICATION

This application is a non-provisional patent application claiming priority to U.S. Provisional Patent Application No. 63/289,515, filed Dec. 14, 2021, titled "Device for Removal of Excess Material from a Test Sample," which is incorporated herein by reference.

FIELD OF THE INVENTION

The disclosed technology relates to a device and method for removal of excess material from a test sample. More particularly, the technology relates to a device for automated removal of excess material from a sample to be used in an instrument for measurement of rheological and mechanical properties of the sample.

BACKGROUND

Materials characterization performed with a rotary rheometer requires a precise sample volume and geometry. In particular, testing of polymer melts involves a series of steps to form the test sample material into a test disk. The material is typically provided in the form of pellets which are then processed to form a homogeneous test disk having a diameter that matches the test geometry. For example, the test geometry may have a 25 mm diameter and the height of the disk may be 5.0 mm or less to match the gap defined by the test geometry.

One method of forming a test disk includes placing solid polymer pellets onto the lower geometry, partially melting the pellets, compressing the partially melted pellets together with the test geometry to form a homogeneous mass and then manually cutting excess material which protrudes beyond the test geometry diameter. The resulting test disks are highly variable in size and performing the method requires significant skill. The variability can yield inaccurate and variable test results. Variability can be the result of many factors such as an inconsistent initial sample volume and variation in the pre-heating time, compression time rate and temperature. Variability in results can also occur due to variation in the amount of material removed, the compression gap height and the time the sample is exposed to oxygen while the method is performed. Environmental exposure time is particularly problematic because polymer testing is typically performed in a chamber having a controlled atmosphere. The trimming of excess material requires manual manipulation and therefore the chamber must be opened, which results in atmospheric variability due to the exposure to ambient air and thermal variability due to cooling.

SUMMARY

In one aspect, a device for removal of excess material from a test sample includes a test geometry, a trimming ring and an actuator. The test geometry includes a lower geometry and an upper geometry each having a circular outer edge and being centered on an axis of rotation. At least one of the lower and upper geometries is configured to rotate about the axis of rotation. The trimming ring has a sidewall, a ring axis coincident with the axis of rotation and at least one cutting edge disposed along at least a portion of a circumference of the trimming ring at a diameter that is at least as great as a diameter of at least one of the lower geometry and the upper geometry. The actuator is coupled to the trimming ring and is configured to translate the trimming ring in a direction parallel to the axis of rotation.

The lower geometry may include a lower plate and the upper geometry may include an upper plate. An outer diameter of one of the geometries may be less than a diameter of the other geometry.

The trimming ring may be positioned so that a well to receive a sample material is defined when the sidewall is adjacent to an outer edge of the lower geometry or the upper geometry. The trimming ring may have a base having a surface that extends radially outward with respect to the axis of rotation from the circumference of the trimming ring.

The actuator may be further configured to rotate the trimming ring about the axis of rotation. The one or more cutting edge may be a circular cutting edge disposed at an end of the sidewall.

The sidewall may include a plurality of apertures and a portion of the sidewall that surrounds each aperture includes a cutting edge. Each aperture may be shaped as a slot in the sidewall. An end of each slot may overlap an end of an adjacent slot along a length of the trimming ring.

The sidewall may be defined by a plurality of fingers each extending from a base of the trimming ring with a gap separating each finger from adjacent fingers. Each of the fingers has a cutting edge that is disposed at an acute angle with respect to a length of the trimming ring. The fingers may be formed of a flexible material. Each of the fingers may have an end disposed opposite to the base of the trimming ring and a portion of the finger at the end may be bent away from the axis of rotation. Each finger may have a front edge having a serrated profile. The serrated profile may include one or more projections and the one or more projections. The one or more projections may include one or more teeth wherein a shape of one of the teeth may be different from a shape of another one of the teeth.

In another aspect, a method for removal of excess material from a test sample includes providing a sample material between a lower geometry and an upper geometry of a rheometer where each of the geometries has a circular edge and is configured to rotate about an axis of rotation. The method further includes providing a trimming ring that includes a sidewall, a ring axis coincident with the axis of rotation and at least one cutting edge disposed along at least a portion of a circumference of the trimming ring at a diameter that is at least as great as a diameter of at least one of the lower and upper geometries. The method further includes translating the trimming ring in a direction parallel to the axis of rotation so that the one or more cutting edges move past the circular edge of at least one of the lower and upper geometries to thereby remove an excess of sample material protruding outside the circumference of the trimming ring.

The method may further include applying heat to the sample material provided between the lower and upper geometries and compressing the sample material between the lower and upper geometries to form the test sample.

The test sample may be a sample disk and the lower and upper geometries may be circular plates.

The at least one cutting edge may be a plurality of cutting edges and the method may further include rotating the trimming ring about the axis of rotation when the cutting edges are adjacent to the lower and upper geometries.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

FIGS. 4A to 4I are cross-sectional schematic depictions of a device for removal of excess sample material shown according to a sequence of steps for forming a test sample with excess material removed using the trimming ring of FIG. 2.

FIGS. 8A to 8H are cross-sectional schematic depictions of a device for removal of excess sample material shown according to a sequence of steps for forming a test sample using the device of FIGS. 5 to 7.

DETAILED DESCRIPTION

Reference in the specification to an embodiment or example means that a particular feature, structure, or characteristic described in connection with the embodiment or example is included in at least one embodiment or example of the teaching. References to a particular embodiment or example within the specification do not necessarily all refer to the same embodiment or example.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Those of ordinary skill having access to the teaching herein will recognize additional implementations, modifications, and embodiments, as well as other fields of use, which are within the scope of the present disclosure as described herein.

As used herein, "test geometry" means the two elements between which a sample material is held for measurements. The test geometry generally includes an upper geometry and a lower geometry. In some examples, the test geometry includes an upper plate and a lower plate; however, other configurations, such as cones and concentric cylinders, may be used. The plates may be circular plates and the diameters may be the same or may differ. At least one of the upper and lower geometries is configured to rotate with respect to the counterpart geometry.

In brief overview, embodiments and examples disclosed herein are directed to a device and method for the automated removal of excess material from a test sample. The test sample may be used in an instrument for measurement of rheological and mechanical properties of the sample. The device includes a test geometry and a trimming ring. The test geometry includes a lower geometry and upper geometry each having a circular outer edge and being centered on an axis of rotation. The trimming ring has a sidewall, a ring axis coincident with the axis of rotation and at least one cutting edge disposed along at least a portion of a circumference of the trimming ring at a diameter that is at least as great as a diameter of one or both lower and upper geometries. The device further includes an actuator coupled to the trimming ring and configured to translate the trimming ring in a direction parallel to the axis of rotation. In contrast to manual trimming techniques, the device provides many benefits, including generating repeatable sample volumes, reducing sample preparation time and limiting exposure of the sample.to the ambient environment.

Figure 1:
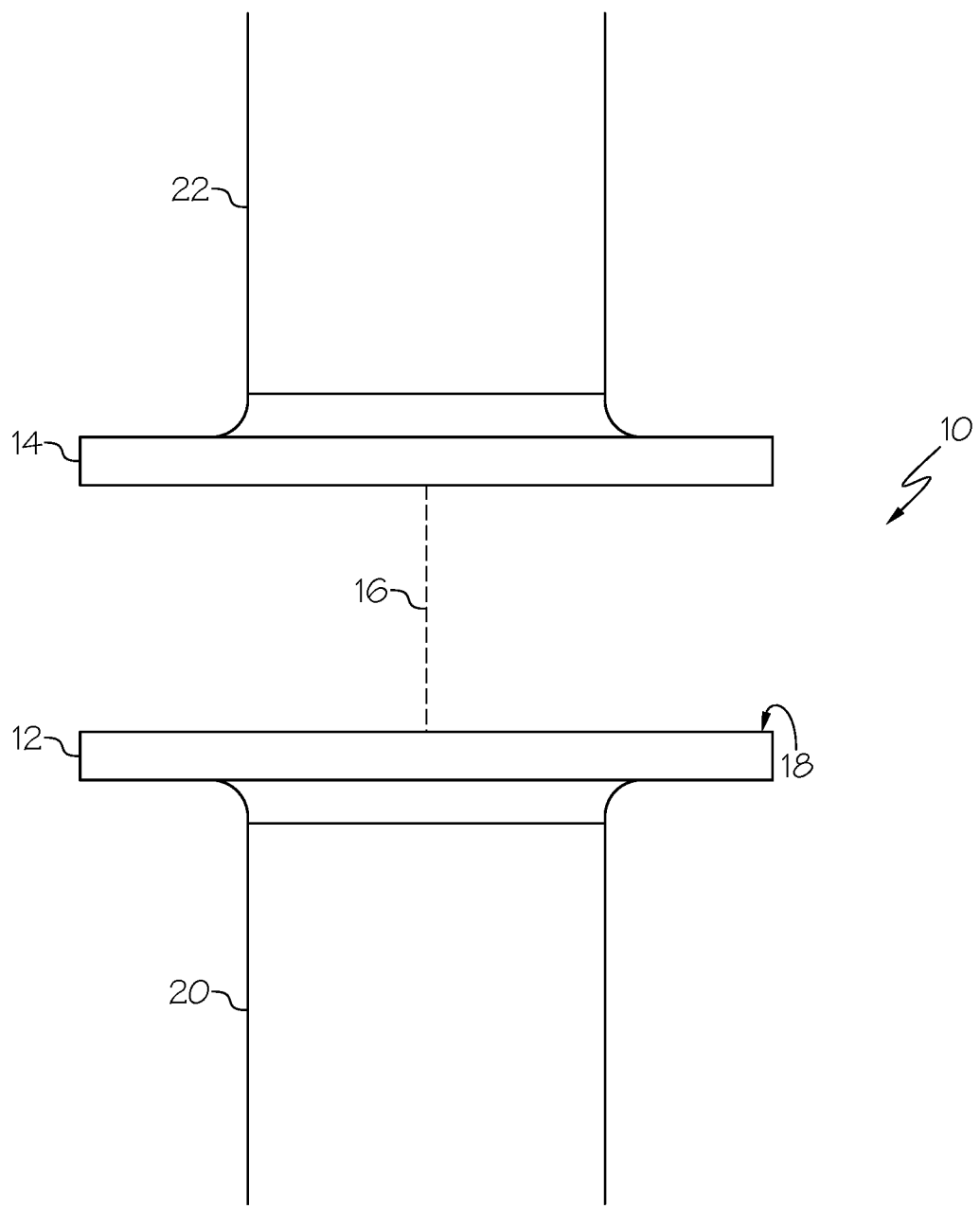
FIG. 1 is a side view of a test geometry for performing rheological measurements of a test sample.

FIG. 1 is a side view of a test geometry 10 for performing rheological measurements of a test sample. The test geometry 10 is arranged inside a chamber that provides a controllable atmospheric composition and temperature environment for performing rheological testing. By way of nonlimiting examples, the chamber may be an oven, furnace, Peltier heater, reaction chamber or other chamber in which temperature and/or humidity is controlled. The test geometry 10 includes a lower geometry comprised of a circular plate 12 and an upper geometry that includes another circular plate 14. Each circular plate 12 and 14 is attached to the end of a shaft 20 and 22, respectively. The plates 12, 14 are centered on an axis of rotation 16 and the axes of the shafts 20, 22 are coincident with the axis of rotation 16. A sample to be tested is positioned between the plates 12, 14. During testing, one of the plates 14 rotates about the axis 16 while the other plate 12 may remain stationary or rotate in the same or opposite direction.

In conventional test preparation, the test sample is generated by placing pellets, powder, or granules of a test material (e.g., polymers (such as polydimethylsiloxane (PDMS)), curative materials and gels) inside a well that is defined by a melt ring (not shown). The melt ring is positioned around the circumference of the lower circular plate 12 and extends upward above the inner surface 18 of the lower plate 12. The melt ring prevents the sample material from rolling from or otherwise falling off the inner surface 18. To form a disk of the sample material, heat is supplied by the chamber to melt the sample material and the separation ("gap") between the two plates 12, 14 is decreased so that the sample material is squeezed into a nominal circular disk. The melt ring is then removed, and the gap is further decreased, resulting in an outward flow of the sample material. A manual trimmer (i.e., a "scraper") is used to remove the excess sample material that extends beyond the desired diameter of the disk-shaped test sample. Typically, the desired diameter is the diameter of the one or both plates 12, 14. The trimmer includes a cutting edge that scrapes away the material that extends beyond the circumferential edges of the plates 12, 14. What remains after the scraping is a properly positioned test sample for rheological measurement. When fully formed and trimmed, the test sample is in the form of a uniform disk (i.e., no unintentional voids in the material) and has an outer diameter that matches the outer diameter of the two plates 12, 14. Prior to rheological testing, the sample may be further compressed after trimming to reach the desired edge geometry.

This conventional test sample preparation process requires multiple openings of the chamber. Each opening results in changes the internal chamber temperature and therefore changes the temperature of the sample material. In addition, each opening of the chamber results in exposure of the sample material to the ambient atmosphere. These openings can increase the preparation time for testing and adversely affect test results. In addition, trimming of the excess material is a skilled process that requires a trained operator, and the repeatability of measurements can therefore be affected according to the skill of the operator.

Figure 2:
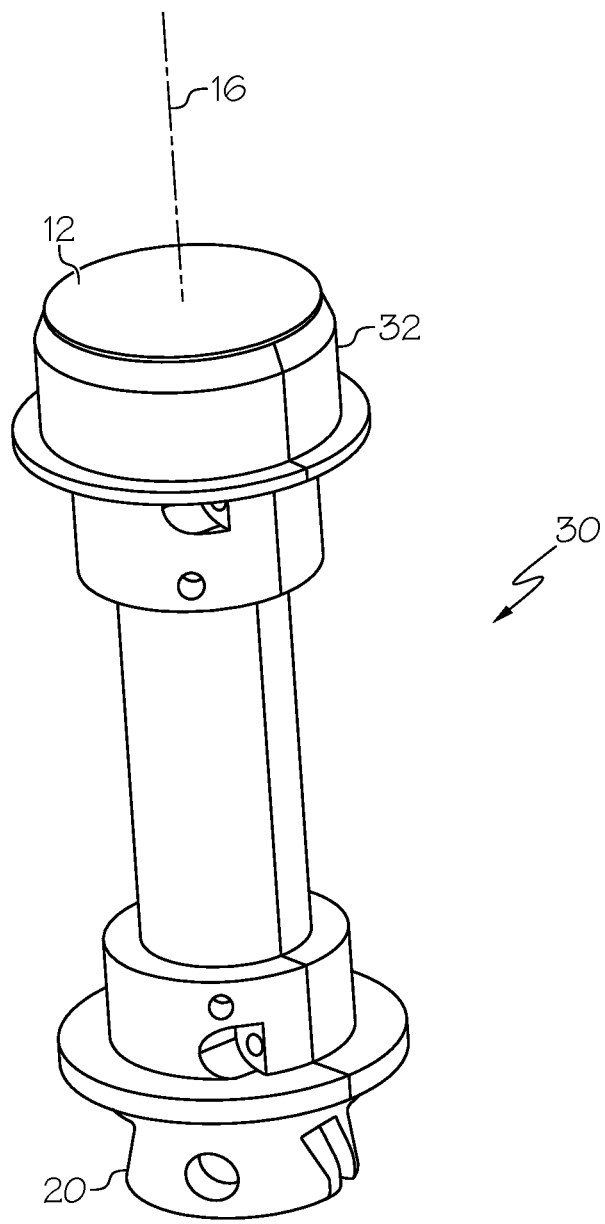
FIG. 2 is a perspective view of an example of a device for removal of excess material from a test sample for rheological measurement.
Figure 3:
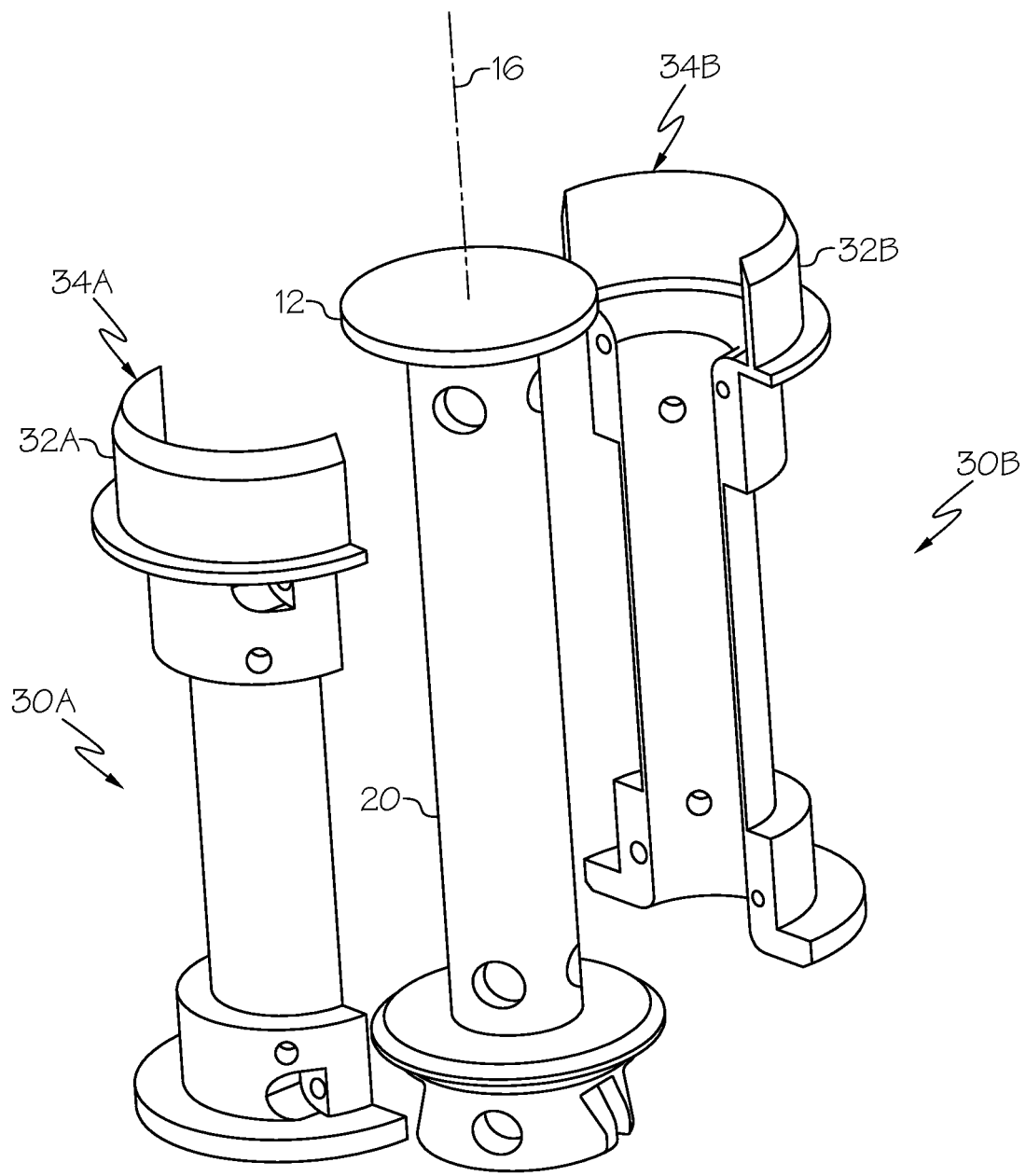
FIG. 3 is an exploded view of the device of FIG. 2.

FIG. 2 shows a perspective view of an example of a device 30 for removal of excess material from a test sample for rheological measurement. Reference is also made to FIG. 3 which shows an exploded view of the device 30 of FIG. 2. The device 30 is formed from two sections 30A and 30B each having a substantially hollow half-cylinder shape. The sections 30A, 30B may be secured to each other using bolts or other fasteners so that the assembled device 30 circumferentially surrounds the lower shaft 20 and is translatable along the axis of rotation 16. At the upper end of the device 30 is a trimming ring 32 for removing excess material from test samples in a repeatable manner without requiring the chamber to be opened. A sharp cutting edge 34 is provided at the top end of the trimming ring 32 at an inner diameter that is slightly greater than the outer diameter of the circular plates 12, 14. By way of a non-limiting numerical example, for plates having a 25 mm outer diameter, the gap between the inner diameter of the trimming ring 32 and the circumferential edges of the plates 12, 14, may be 50 µm or less. The trimming ring 32 is used both as a melt ring and a component that shears off the excess sample material. In an alternative example, the trimming ring sections 32A, 32B, may be separate components that are secured at the end of the corresponding components 32A, 32.

The device 30 is secured at its lower end to an actuator to cause upward and downward device movement in a direction parallel to the rotation axis 16 and independent of any motion of the shaft 20. The actuator may include external actuation, manual actuation and/or include a motorized actuation mechanism. In some implementations, a magnetic actuator or other form of non-contact actuator is used. In another example, the actuator includes a pneumatic cylinder. In other examples, other systems known to those of skill in the art that enable movement parallel to the rotation axis 16 are used such as a spring loaded actuator with a latch release. By way of non-limiting examples, the trimming ring 32 may be made of stainless steel, titanium, or aluminum.

Figure 4E:
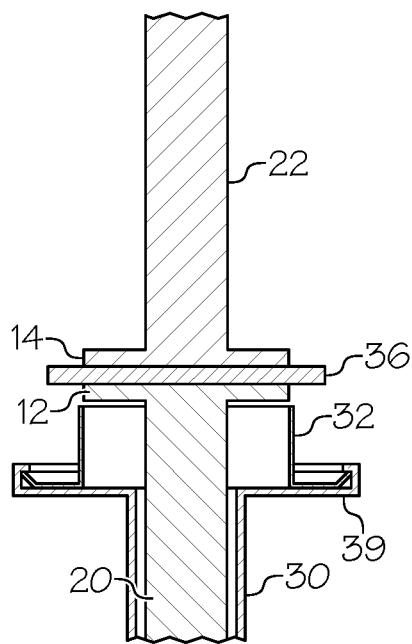

FIGS. 4A to 4I are cross-sectional schematic depictions for a sequence of steps for forming a test sample with excess material removed using the trimming ring 32 shown in FIG. 2. FIG. 4A shows the lower and upper circular plates 12, 14, separated and FIG. 4B shows the trimming ring 32 moved upward to form a well to receive the raw sample material used to form the disk-shaped test sample. The well is defined by a volume above the lower plate 12 that is inside the sidewall of the trimming ring 32. The raw sample material may be in the form of a single material piece, powder, granules, pellets, and the like. FIG. 4C shows the well occupied in part with the raw sample material 36 disposed on the lower plate 12. The test material 36 is then heated, the trimming ring 32 moved downward below the lower plate 12 and the upper plate 14 is moved downward to come into contact with the heated sample material as shown in FIG. 4D. FIG. 4E shows the upper plate 14 after further downward movement so that excess sample material extends radially outward beyond the circumferences of the plates 12, 14, resulting in compressed sample material between the plates 12, 14, that is substantially homogeneous.

Figure 4F:
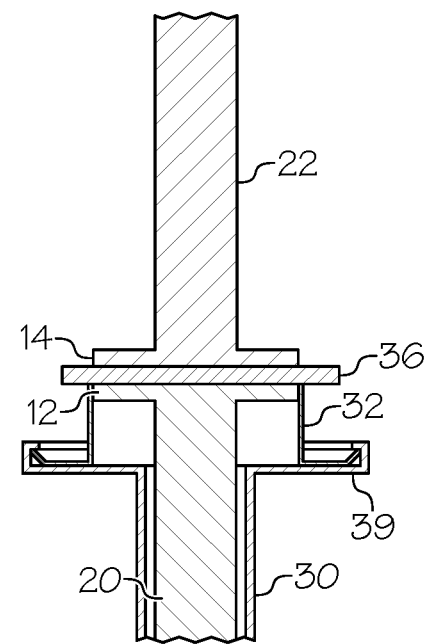
Figure 4G:
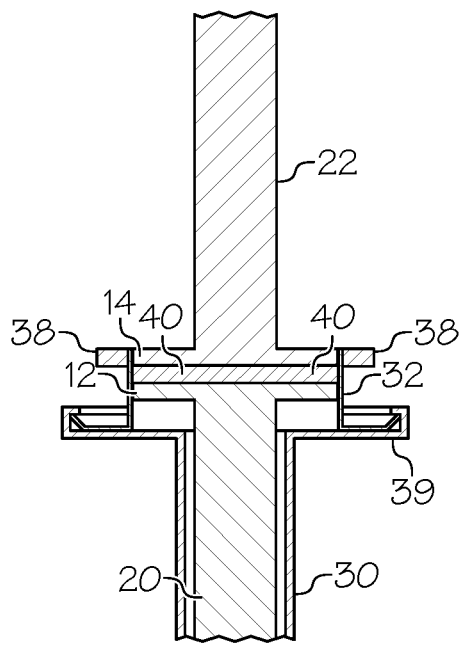
Figure 4H:
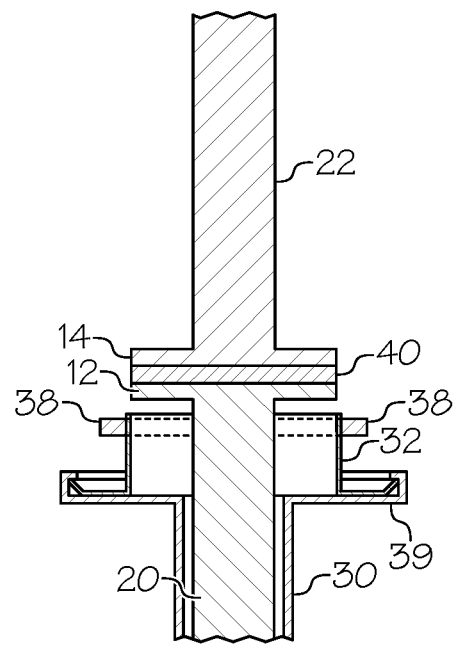
Figure 41:
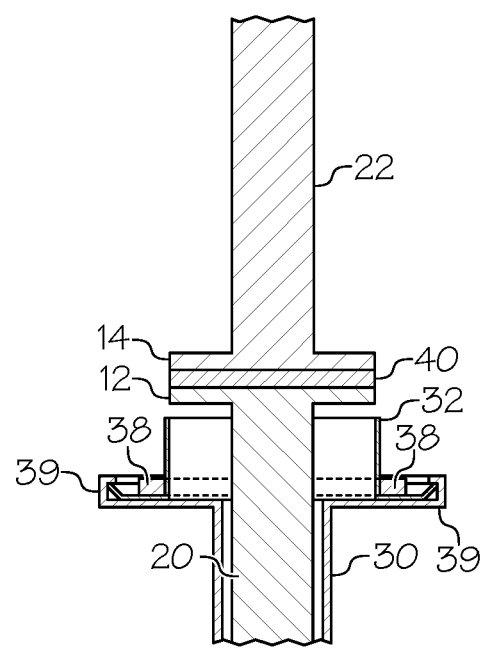

To remove the excess sample material, the trimming ring 32 is moved upward so that the cutting edge 34 (see FIG. 3) is in contact with the bottom side of the sample disk as shown in FIG. 4F. Further upward movement of the trimming ring 32 to a position at which the cutting edge 34 is above the upper plate 14 results in the cutting of the sample material at the circumferences of the lower and upper plates 12, 14, as shown in FIG. 4G. The excess sample material 38 trimmed from the outside edge of the test sample disk 40 may adhere to the outside of the trimming ring 32. Subsequently, as shown in FIG. 4H, the trimming ring 32 is moved downward so that the cutting edge 34 is below the lower plate 12. The excess sample material 38 may fall onto a collection surface (e.g., ring base 39 which supports the trimming ring 32) as shown in FIG. 4I. The excess sample material 38 may be removed when access to the chamber is available. Alternatively, the chamber temperature may be increased so that the material is burned into ash which may be removed at a future convenient time.

The punch-like operation described for FIGS. 4A to 4I results in repeatable formation of disk-shaped test samples having repeatable thicknesses and diameters. In an alternative implementation, the diameter of the upper plate is greater than the diameter of the lower plate. The sequence of steps to form a test sample with excess material removed is similar; however, instead of the trimming ring 32 moving upward past the circumferential edge of the upper plate 14, as shown in FIG. 4G, the trimming ring 32 comes into contact with the lower surface of the upper plate 14. In this manner, the excess material is trimmed by pressing the trimming ring 32 against the upper plate 14.

Figure 5:
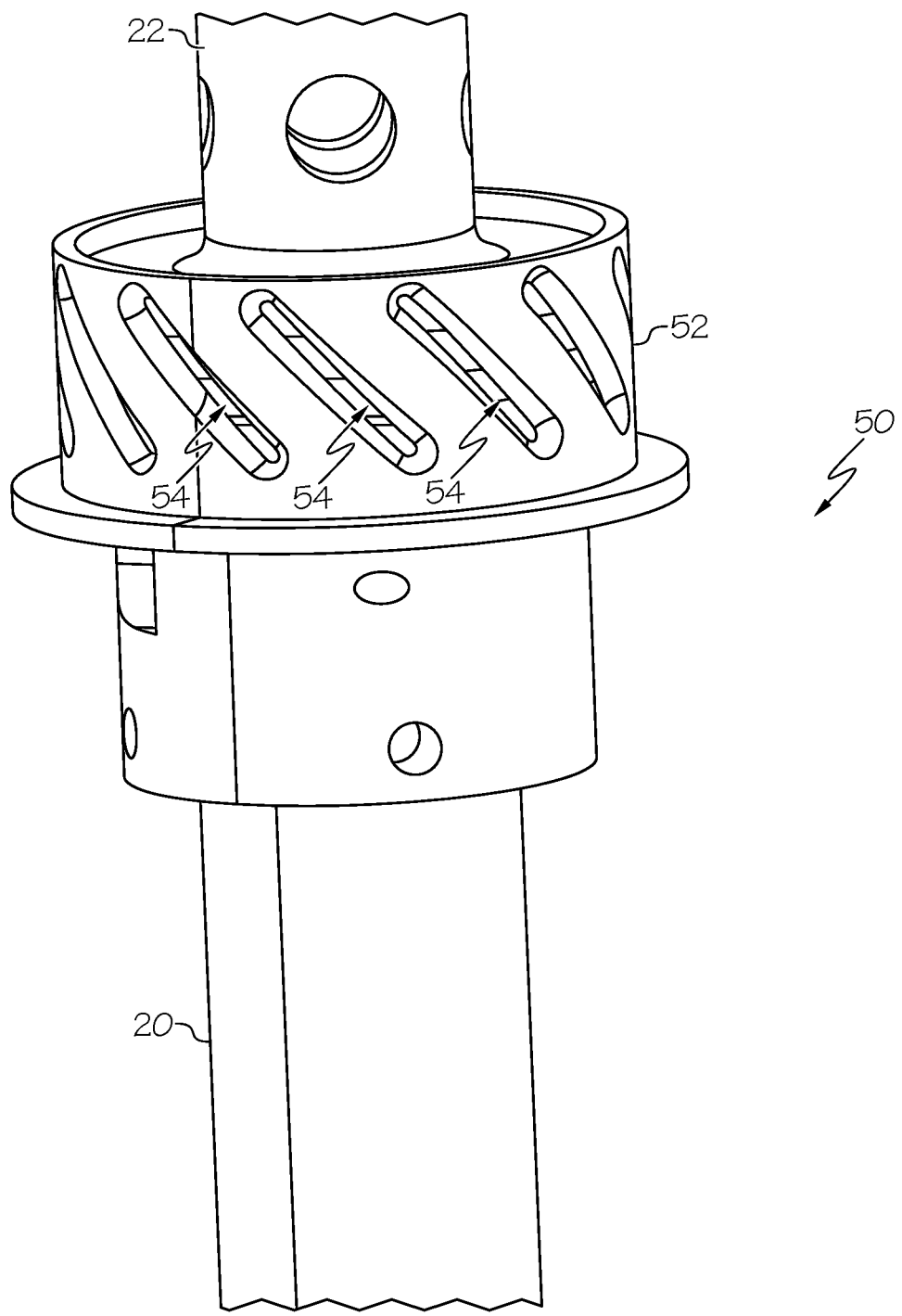
FIG. 5 is a perspective view of another example of a device for removal of excess material from a test sample for rheological measurement.
Figure 6:
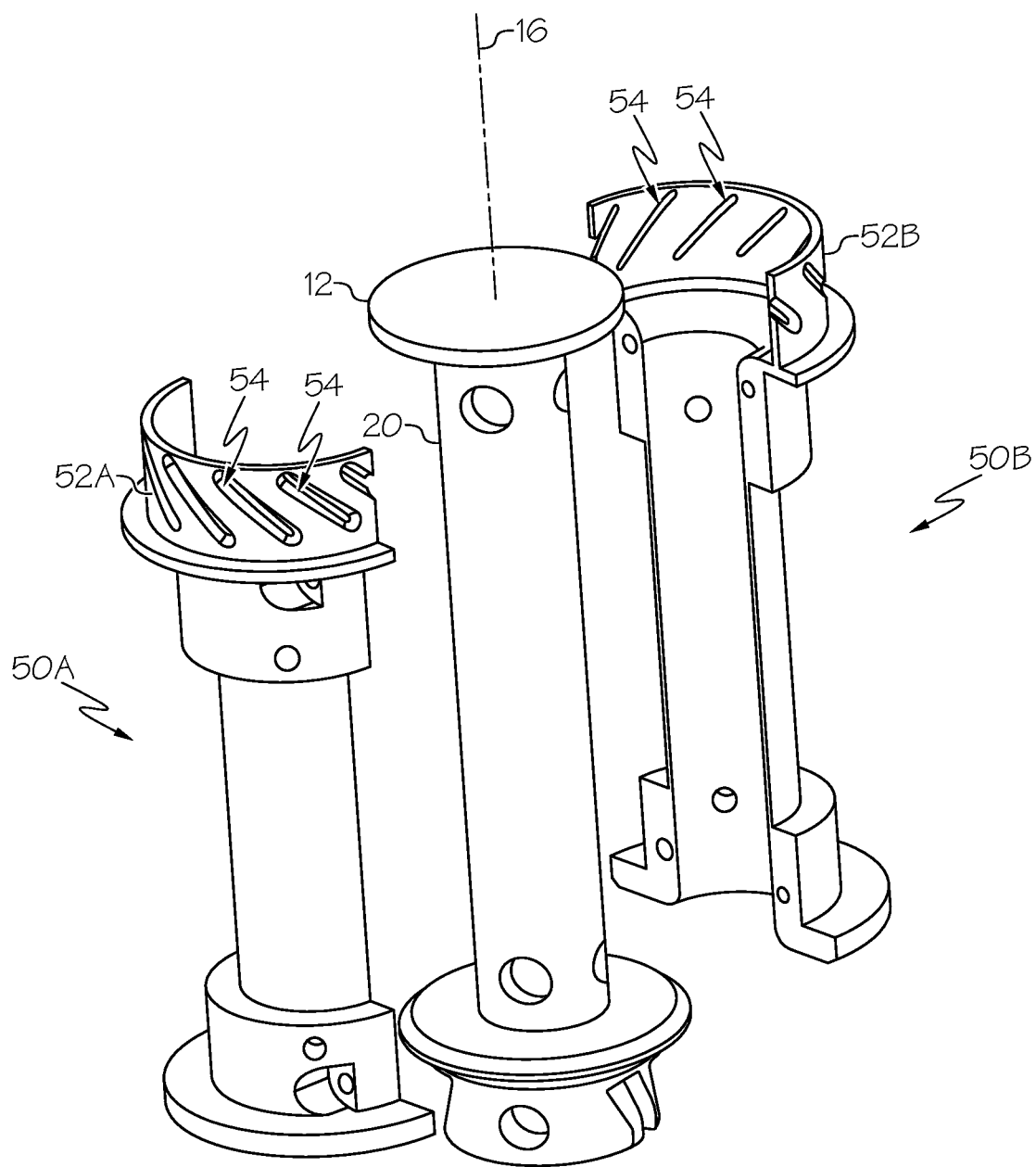
FIG. 6 is an exploded view of the device of FIG. 5.

FIG. 5 shows another example of a device 50 for removal of excess material from a test sample for rheological measurement. Reference is also made to FIG. 6 which shows an exploded view of the device 50 of FIG. 5. The device 50 is formed by two sections 50A and 50B each having a substantially hollow half-cylinder shape. The sections 50A, 50B are secured to each other using bolts or other fasteners so that the assembled device 50 circumferentially surrounds the lower shaft 20 and is translatable in a direction parallel to the axis of rotation 16. The device 50 includes a trimming ring 52 at an upper end for removing excess material from test samples. The trimming ring 52 is shown in two portions 52A and 52B each attached to a corresponding section 50A and 50B.

The trimming ring 52 includes a sidewall having multiple circumferentially disposed apertures 54. Each aperture includes a cutting edge 56 that is used for removing excess sample material when the device 50 is moved by an actuator vertically along the axis of rotation 16, as described in more detail below. To maintain visual clarity, not all apertures 54 and cutting edges 56 are labeled in the two figures. The trimming ring 52 functions as a melt ring during the initial stages of a process for forming the test sample.

Figure 7:
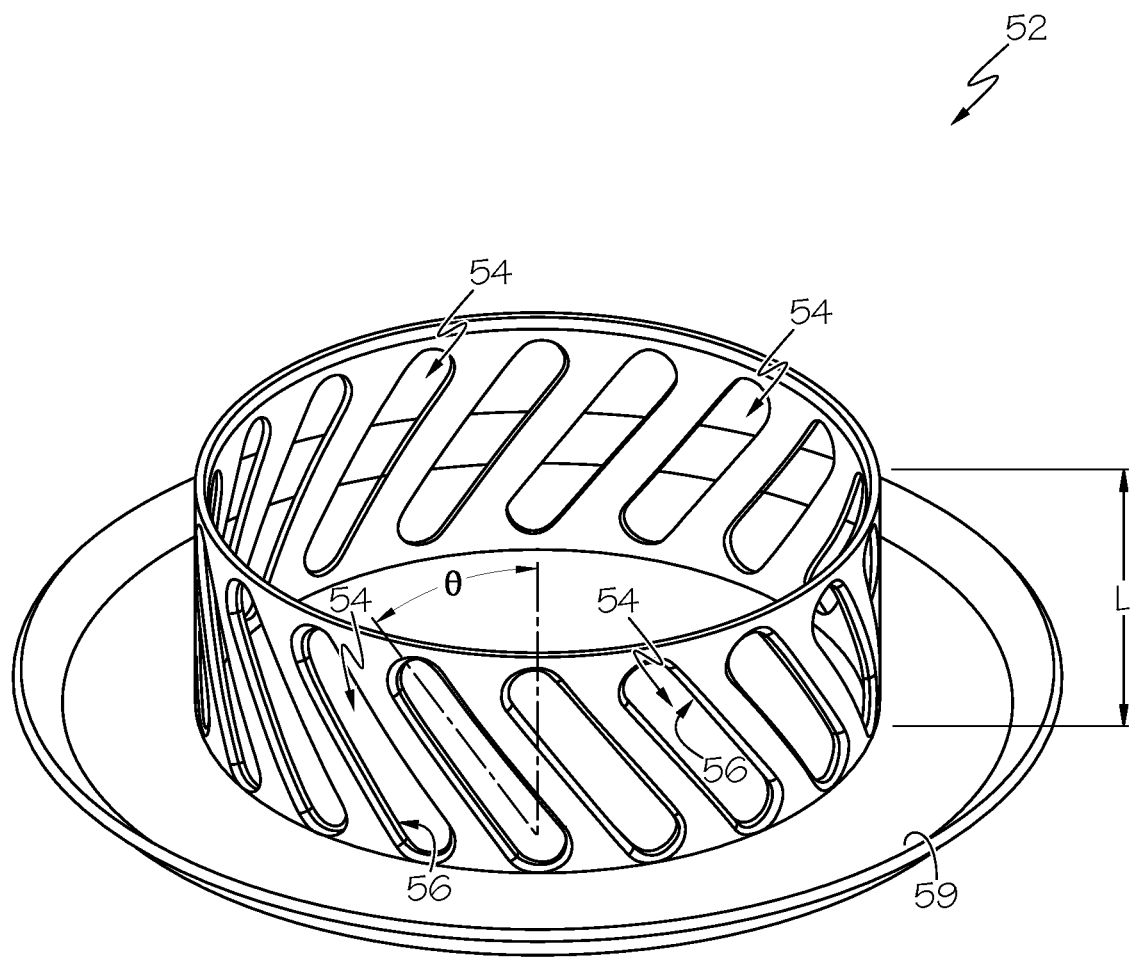
FIG. 7 is a magnified view of the trimming ring in FIG. 5.

FIG. 7 is a magnified view of the trimming ring 52 showing the apertures 54 in the sidewall and wherein at least a portion of the sidewall that surrounds each aperture 54 has a cutting edge 56. The trimming ring 52 may be formed of stainless steel, titanium, aluminum, or another material compatible with test sample materials and suitable for use across the operating temperature range of the chamber. Each aperture 54 is shaped as a slot through the curved sidewall. Each slot includes two parallel sides and two curved end sections each joining the ends of the parallel sides at one end of the slot. The edges of each slot can be made of thin material and/or sharpened or serrated. For example, each slot in the sidewall is tapered through the thickness of the sidewall such that the slot as defined at the outer surface of the sidewall is larger than the slot at the inner surface of the sidewall, resulting in a sharp edge at the inner surface of the sidewall.

As shown in the figure, the axis of each slot is defined at an angle θ with respect to the length/of the sidewall. In the illustrated example, the angle θ is approximately 40° although other acute slot angle orientations, vertical slots and horizontal slots are contemplated, as described below. Moving the device 50 vertically, i.e., in a direction parallel to the axis of rotation 16 gives a relative rotational movement effect to the cutting edges 56. To ensure that vertical motion of the device 50 results in trimming the entire circumference of the disk-shaped test sample, the ends of adjacent slots at the inner sidewall surface are vertically overlapped. This ensures that at least one cutting edge is present along the full 360° of the circumference of the trimming ring 52. The number of apertures 54 may be different than shown in the figure as long as the vertical overlap of adjacent slots exists. For example, a trimming ring 52 having fewer apertures 54 is possible if the angle θ with respect to the vertical direction is increased or if the length L of the sidewall is increased so that each slot has a greater extent along the circumference. The size of the apertures 54 may be selected according to the type of material to be tested. A more viscous sample material preferably would be used with larger apertures 54 than a less viscous sample material to allow the sample material to pass through the apertures 54 more efficiently during the disk formation process when the gap between the plates 12, 14, is reduced and the sample material is compressed.

The trimming ring 52 includes a base 59 that extends radially outward from the sidewall and may be used to capture excess material trimmed from the test sample. The base 59 may be used to secure the trimming ring 52 to the device 50. For example, the device 50 may include a flange or similar structure at the upper end that supports the base 59. The inner diameter of the base 59 provides sufficient clearance to allowed vertical movement of the lower shaft 20 without interference. Advantageously, the base 59 enables the capture of excess material that is trimmed from the test sample which otherwise may fall to another surface in the chamber, requiring additional effort for removal. Additionally, any excess material that remains on the sidewall of the trimming ring 52 should be removed before subsequent sample preparation and testing. The trimming ring 52 can be removed and cleaned after the termination of testing and then reinstalled in position within the rheological instrument for the next sample preparation. Alternatively, two or more trimming rings 52 may be made available so that one or more trimming rings can be cleaned while using a different trimming ring to avoid testing delays.

FIGS. 8A to 8H are cross-sectional schematic depictions of a device for removal of excess sample material demonstrating an example sequence of steps for forming a test sample using the device of FIGS. 5 to 7. In these views it will be recognized that only the back side of the trimming ring 52 is visible with a portion of the back side obscured in some of the figures by the lower plate 12, lower shaft 20, sample material 36 and/or sample disk 40.

Figure 8E:
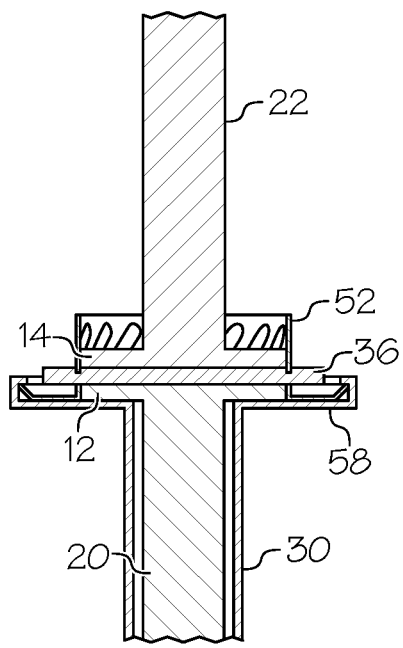

FIG. 8A shows the trimming ring 52 in an initial position in which the sidewall is entirely below the surface 18 of the lower plate 12. The trimming ring 52 is then moved upward, as shown in FIG. 8B, to a position where the surface 18 and sidewall of the trimming ring 52 define a well to receive the raw sample material. The raw sample material 36 may be in the form of a single material piece or pellets or other pieces of sample material that are too large to pass through the apertures 54 in the sidewall. FIG. 8C shows the well partially occupied with the raw sample material. FIG. 8D shows the upper plate 14 moved downward to a position to first contact the raw sample material 36. The raw sample material 36 is heated and the upper plate 14 is moved downward to compress the heated sample material so that excess sample material flows through the apertures 54. The upper plate 14 continues to move downward to a position shown in FIG. 8E to further compress the sample material and achieve a desired thickness of the test sample. Unlike the sequence of steps described with respect to FIGS. 4A to 4I, there is no need to lower the trimming ring 52 during compression of the sample material as excess sample material flows outward through the apertures 54.

Figure 8F:
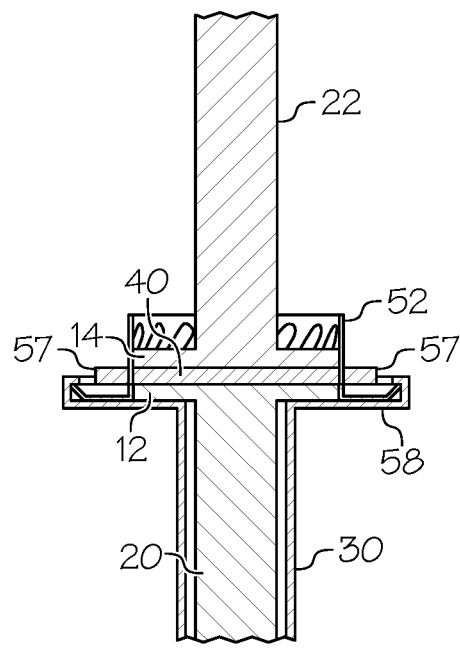
Figure 8G:
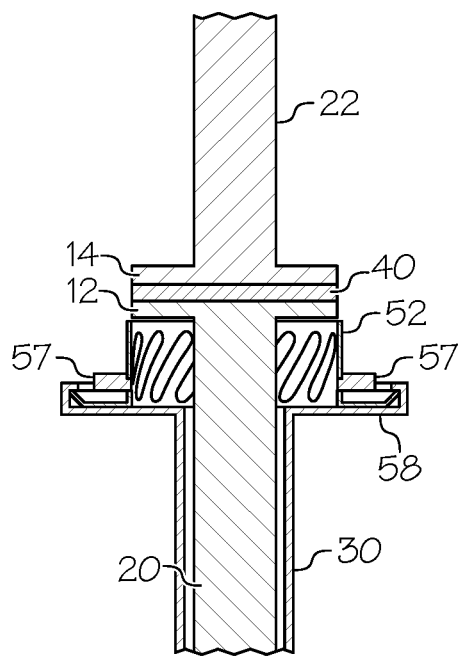
Figure 8H:
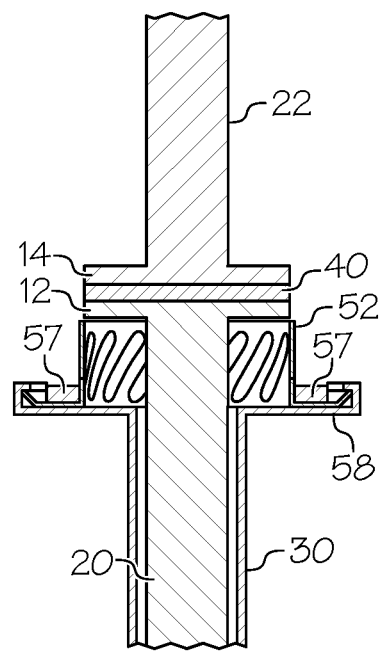

FIG. 8F shows the start of the trimming process wherein the trimming ring 52 begins to move downward so that the cutting edges 56 in the apertures 54 begin to trim, or slice, the excess sample material from the test sample disk. FIG. 8G shows the trimming ring 52 after completing its downward motion to a position where the top of the trimming ring 52 is below the lower plate 12 and the excess material 57 is shown adhering to the outer surface of the sidewall. FIG. 8H shows how excess sample material 57 that does not remain on the sidewall of the trimming ring 52 has fallen onto the base 59 (see FIG. 7) from where it may be removed when access to the chamber is provided.

In an alternative example of the sequence, the trimming ring 52 is rotated about the axis of rotation 16 to trim the test sample disk to the desired diameter. A full rotation of the trimming ring 52 is not required; however, the angle of rotation preferably corresponds at least to the separation of adjacent apertures 54 to ensure a full circumferential trimming of the test sample. In yet another example, a combination of vertical and rotational motion imparted to the trimming ring 52 may be used to trim the test sample disk.

Figure 9:
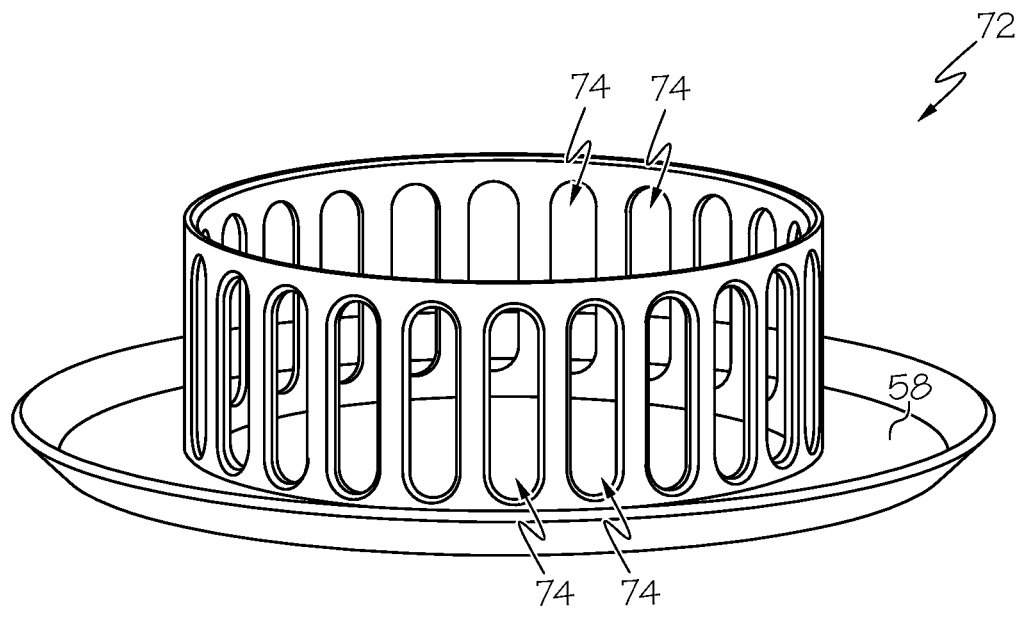
FIG. 9 shows another example of a trimming ring that may be used for removal of excess material from a test sample.

FIG. 9 is an illustration of another example of a trimming ring 72. In this example, the slots defining the apertures 74 are arranged with their long axes in a vertical orientation, that is, parallel to the axis of rotation of the upper and lower plates (not shown). The method for removing excess sample material is similar to that described above with respect to FIGS. 8A to 8H. During the trimming process (cf. FIG. 8C), the trimming ring 72 is vertically positioned so that the upper ends of the apertures 74 are above the surface of the upper plate 14 in contact with the sample material and the lower ends of the apertures 74 are below the surface of the lower plate in contact with the sample material. The actuator is configured to provide rotational motion of the trimming ring 72 about the axis of rotation of the lower and upper plates to enable trimming the full circumference of the test sample disk. The trimming ring 72 is rotated through an angular range that is at least as large as the angle defined between adjacent apertures with respect to the axis of rotation.

Figure 10:
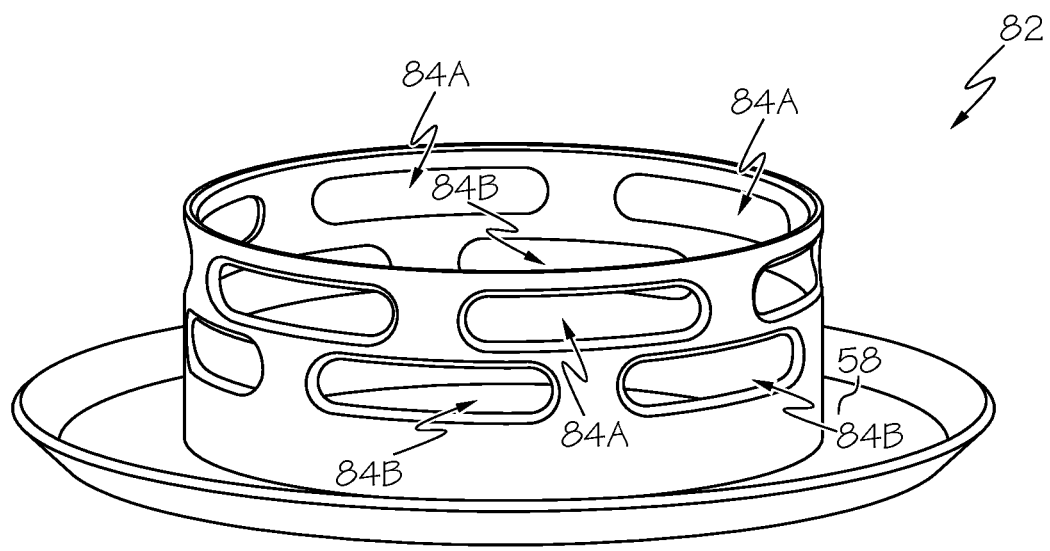
FIG. 10 shows another example of a trimming ring that may be used for removal of excess material from a test sample.

FIG. 10 is an illustration of yet another example of a trimming ring 82. The slots defining the apertures 84 are arranged with their long axes lying along a portion of the circumference of the sidewall with some of the apertures 84A at a first height above the base 58 and the other apertures 84B at a second height. The apertures 84A are arranged to overlap vertically with the apertures 84B so that vertical movement of the trimming ring 82 ensures that the cutting edge of at least one aperture 84 will be used to cut excess material from any position along the circumference of the test sample disk.

Figure 11:
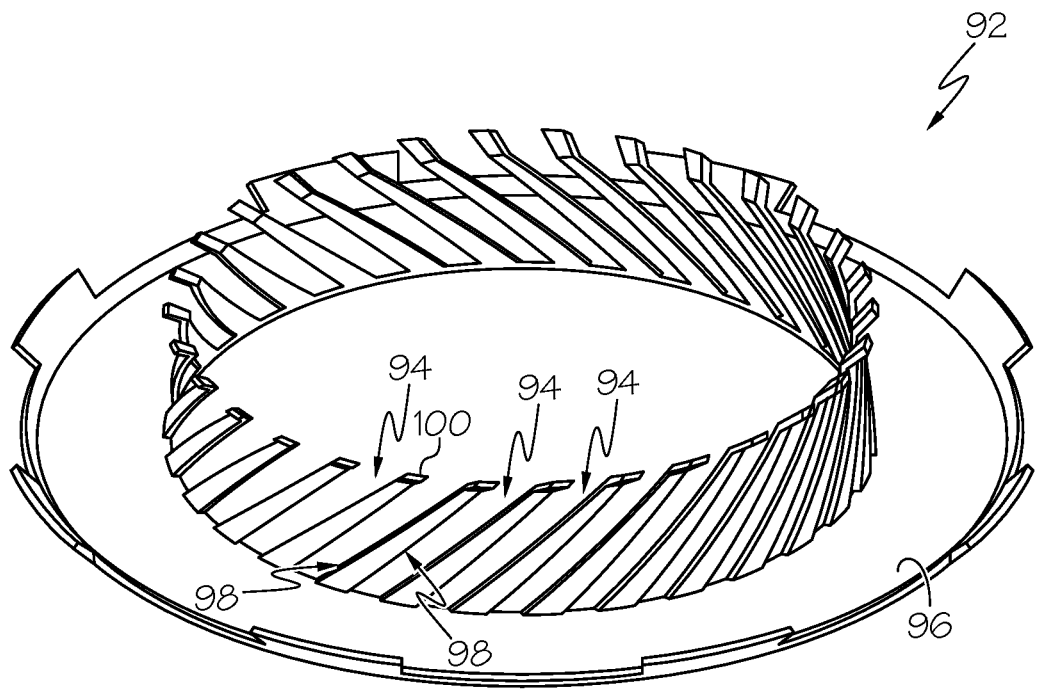
FIG. 11 shows another example of a trimming ring that may be used for removal of excess material from a test sample.

FIG. 11 shows another example of a trimming ring 92 that may be used for removal of excess material from a test sample. The trimming ring 92 may be fabricated from inexpensive materials using techniques that result in a low fabrication cost per unit. Thus, the trimming ring 92 may be a disposable item such that cleaning is not required, and a used ring is simply replaced with a new ring for the next test sample preparation. Instead of apertures in a sidewall, the trimming ring 92 includes extensions ("fingers") 94 that extend upward from a base 96. Each finger includes a cutting edge 98 along its sides. The lower end of each finger 94 lies along a circle at the inner diameter of the base 96 and the upper ends ("tips") 100 of the fingers 94 lie along a circle having a smaller diameter. By way of nonlimiting examples, the smaller circle may have a diameter that is a few tenths of a millimeter to a few millimeters less than the diameter of the larger circle. The difference in the diameters may be selected based on the material properties of the trimming ring 92 and the expected pressure of the sample during compression and extrusion through the spacing between the fingers 94. The tips 100 are bent away from the axis of rotation to enable easy engagement with the lower and upper plates. The trimming ring 92 is preferably formed from a material that enables the fingers 94 to flex and exert a spring force radially inward.

As the trimming ring 92 is moved vertically as part of the excess material removal process, the tips 100 enable the lower and upper plates to pass inside the circumferentially arranged fingers 94 while at least a portion of each finger 94 below the tip 100 engages the circumferential surfaces of the two plates. In this process, the fingers 94 flex away from the axis of rotation. A spring force applied by the fingers 94 maintains contact against the circumferential surfaces of the lower and upper plates. Thus, the cutting edges 98 are held against the circumferential surfaces of the lower and upper plates.

Figure 12:
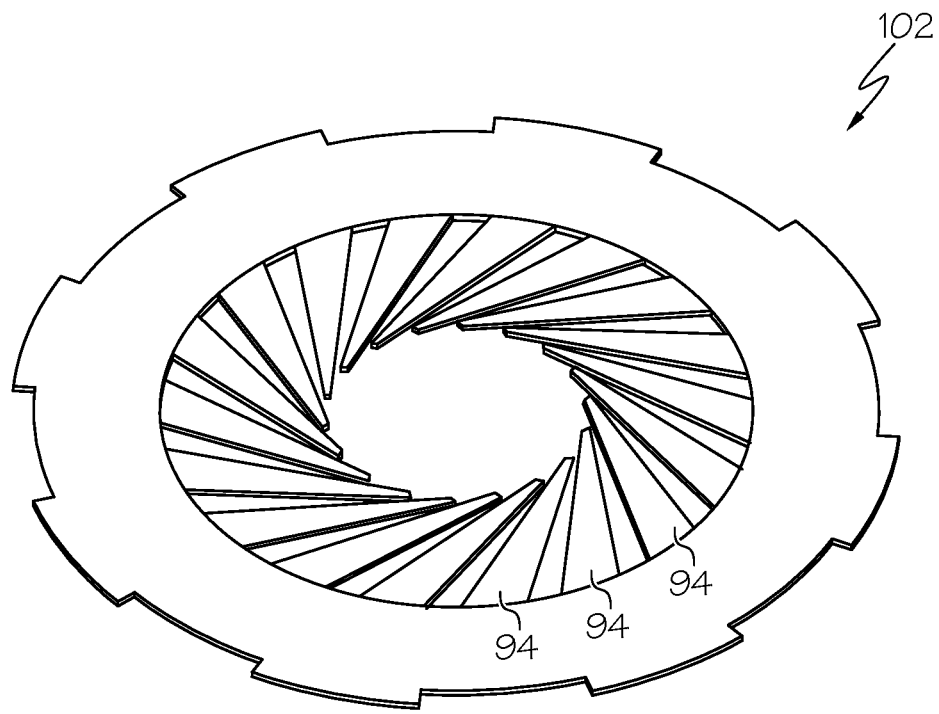
FIG. 12 is an illustration of a processed sheet metal that may be used to make the trimming ring of FIG. 11.

The trimming ring 92 is made, for example, from beryllium copper, phosphor bronze, spring steel, stainless steel, or titanium in an inexpensive fabrication process. For example, the trimming ring 92 may be made from sheet metal using a photo etching process to achieve a desired geometry. FIG. 12 shows an example of a processed sheet metal 102 that may be used. A series of dies are used to press the sheet metal 102 into its final three-dimensional form shown in FIG. 11. Thus, the fabrication process is generally less expensive and quicker that fabrication processes employed to generate the trimming ring 72 of FIG. 7.

Figure 13:
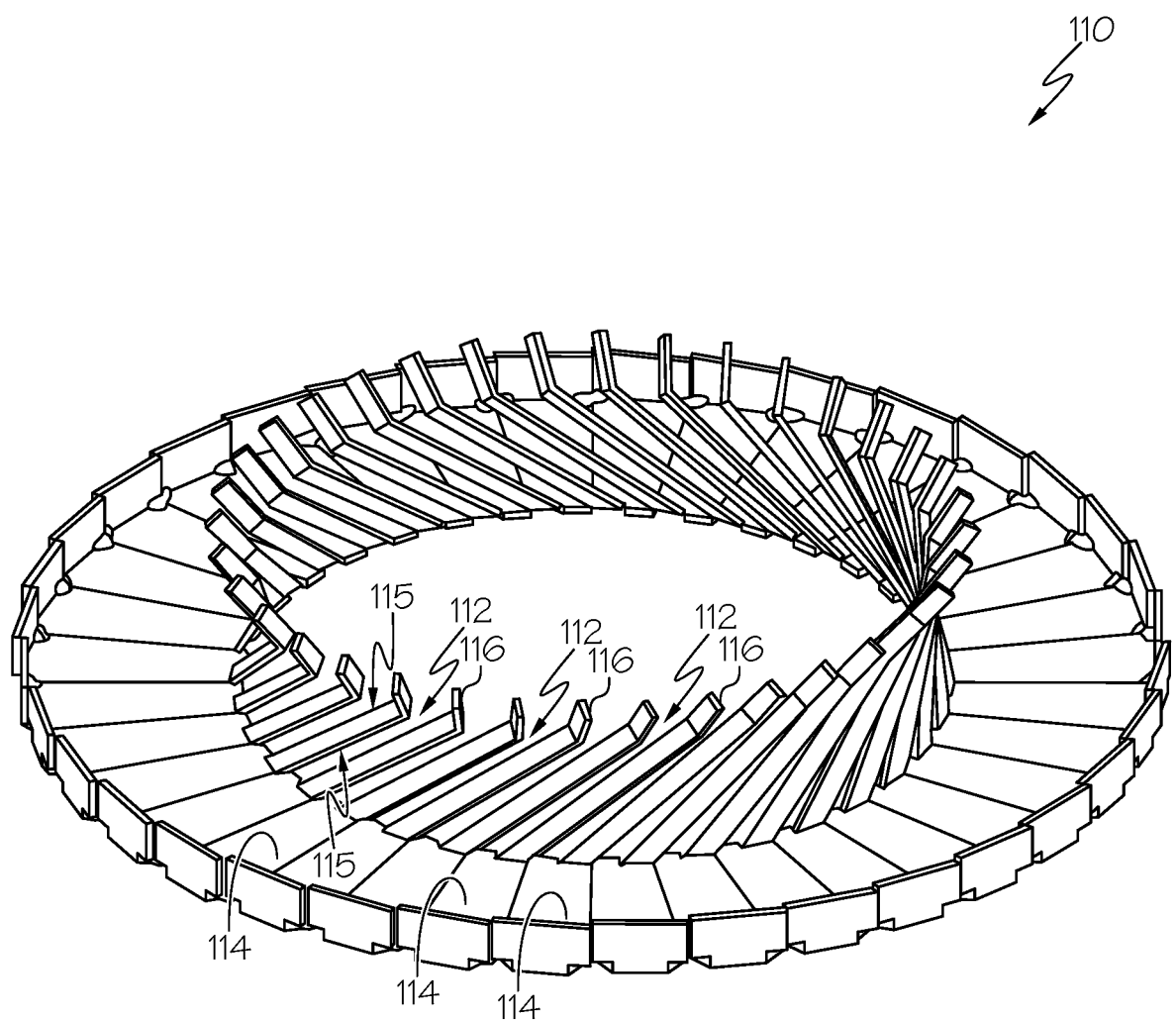
FIG. 13 shows another example of a trimming ring that may be used for removal of excess material from a test sample.

FIG. 13 shows another example of a trimming ring 110 that may be made using an inexpensive fabrication process and may be used as a disposable item. The trimming ring 110 may be made using similar materials to those described with respect to the trimming ring 92 of FIG. 11. The trimming ring 110 includes fingers 112 that extend upward from a base comprised of individual base sections 114. Each finger 112 has a cutting edge 115 along its sides and a tip 116 bent away from the axis of rotation. Each finger 112 and its adjacent base section 114 is identical to the other fingers 112 and their base sections 114. The trimming ring 110 may be made from a single piece of sheet metal having a repeating linear arrangement of the identical fingers 112 and base sections 114. Dies are used to form the desired bends to the sheet metal and the two ends of the linear arrangement are joined to each other to achieve the shape of a ring having the proper diameter to engage the circumferences of the lower and upper plates. The trimming ring 110 can be used to remove excess sample material in a sequence similar to that used with the trimming ring 92 of FIG. 11.

Figure 14:
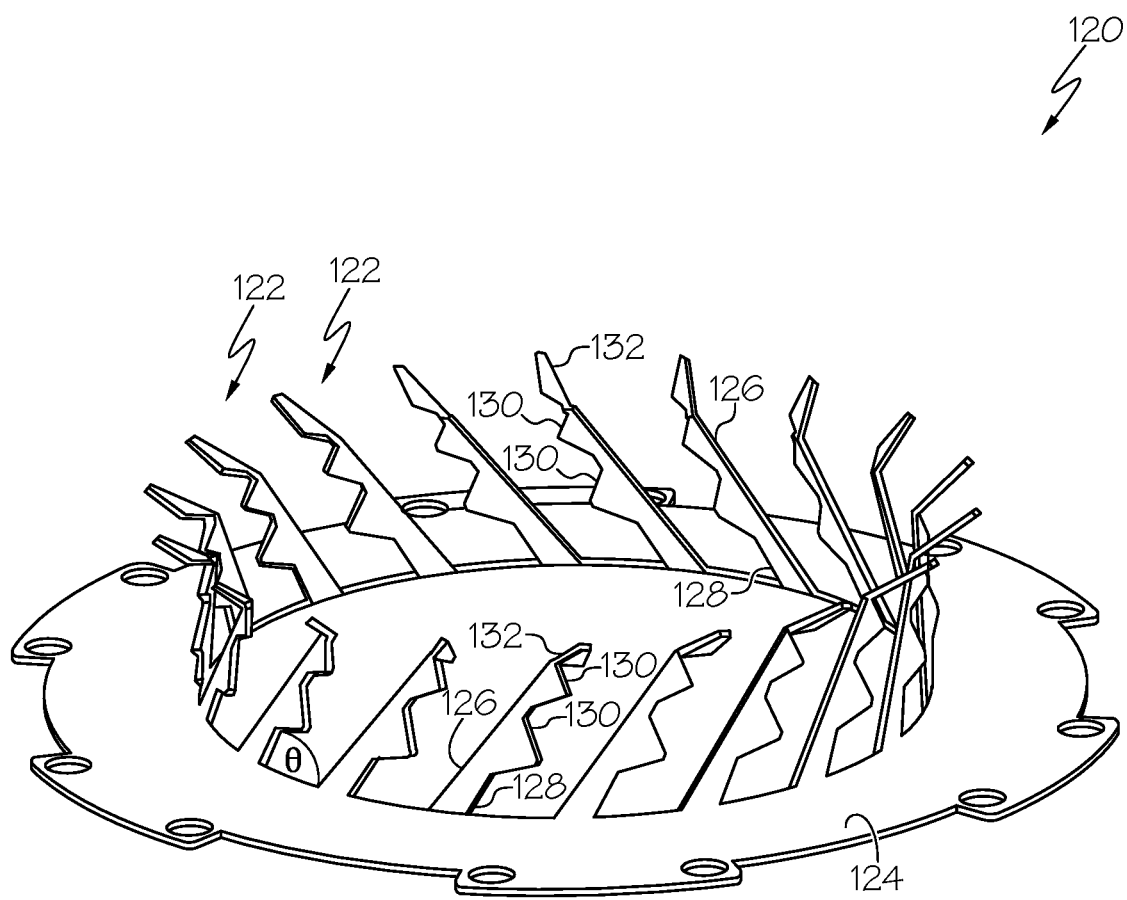
FIG. 14 shows yet another example of a trimming ring that may be used for removal of excess material from a test sample.

FIG. 14 shows yet another example of a trimming ring 120. The trimming ring 120 may be made using processes and materials similar to those described above with respect to FIGS. 11 and 13. The trimming ring includes fingers 122 that extend upward from a flat and nominally annular base 124. Each finger 122 is substantially tangential to an imaginary cylindrical surface for a cylinder having a cylindrical axis that is coincident with the axis of rotation. Each finger 122 includes a back edge 126, a front edge 128 and a tip 132 at the end opposite to the base 124. The tip 132 is bent so that it extends away from the axis of rotation to permit the test geometry to pass through the circular arrangement of fingers when the trimming ring 120 is moved upward. The fingers 122 may flex radially outward during this motion.

In this illustrated example, the front edge 128 has a serrated profile (i.e., saw-like profile) and acts as the cutting edge when the trimming ring 120 is moved downward. The front edge 128 includes two sharp projections (i.e., teeth) 130. In some alternative examples where there is no serrated edge to the fingers 122, the full front edge 128 is used as the cutting edge; however, by using a serrated profile, additional open space between adjacent fingers 122 is provided to allow for more material to squeeze radially outward during sample preparation.

In alternative examples of trimming rings, the angle θ at which the fingers 122 extend from the base 124 may be different and the number of teeth 130 along the front edge 128 may be different. Additionally, the shape of the teeth 130 on a finger 130 may be different. For example, the angle defined between the two sides of one tooth 130 may be different from the angle between the two sides of another tooth 130 on the same finger 122.

In other examples, a heater may be provided in thermal communication with any of the trimming rings described above. For example, the heater (e.g., a cartridge heater) may be mounted directly to the trimming ring at a location that does not interfere with the cutting action. Alternatively, inductive heating may be used. A heated trimming ring enables use at higher temperatures to trim excess material for sample materials that may not otherwise be trimmable at the lower temperature of a non-heated trimming ring. Thus, a heated trimming ring can expand the range of sample compounds that may be trimmed and tested.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. A device for removal of excess material from a test sample, comprising:

a test geometry comprising a lower geometry and an upper geometry each having a circular outer edge and being centered on an axis of rotation, wherein at least one of the lower and upper geometries is configured to rotate about the axis of rotation;

a trimming ring having a sidewall, a ring axis coincident with the axis of rotation and at least one cutting edge disposed along at least a portion of a circumference of the trimming ring at a diameter that is at least as great as a diameter of at least one of the lower geometry and the upper geometry, wherein the sidewall includes a plurality of apertures and wherein at least a portion of the sidewall that surrounds each aperture includes a cutting edge; and an actuator coupled to the trimming ring and configured to translate the trimming ring in a direction parallel to the axis of rotation.

2. The device of claim 1 wherein the lower geometry comprises a lower plate and the upper geometry comprises an upper plate.

3. The device of claim 1 wherein an outer diameter of one of the lower and upper geometries is less than a diameter of the other one of the lower and upper geometries.

4. The device of claim 1 wherein, when the trimming ring is positioned so that the sidewall is adjacent to an outer edge of the lower geometry or the upper geometry, a well to receive a sample material is defined.

5. The device of claim 1 wherein the actuator is further configured to rotate the trimming ring about the axis of rotation.

6. The device of claim 1 wherein the at least one cutting edge is a circular cutting edge disposed at an end of the sidewall.

7. The device of claim 1 wherein each of the apertures is shaped as a slot in the sidewall.

8. The device of claim 7 wherein an end of each slot overlaps an end of an adjacent slot along a length of the trimming ring.

9. The device of claim 1 wherein the trimming ring has a base having a surface that extends radially outward with respect to the axis of rotation from the circumference of the trimming ring.

10. A device for removal of excess material from a test sample, comprising:

a test geometry comprising a lower geometry and an upper geometry each having a circular outer edge and being centered on an axis of rotation, wherein at least one of the lower and upper geometries is configured to rotate about the axis of rotation;

a trimming ring having a sidewall, a ring axis coincident with the axis of rotation and at least one cutting edge disposed along at least a portion of a circumference of the trimming ring at a diameter that is at least as great as a diameter of at least one of the lower geometry and the upper geometry, wherein the sidewall is defined by a plurality of fingers each extending from a base of the trimming ring with a gap separating each finger from adjacent fingers, each of the fingers having a cutting edge that is disposed at an acute angle with respect to a length of the trimming ring; and an actuator coupled to the trimming ring and configured to translate the trimming ring in a direction parallel to the axis of rotation.

11. The device of claim 10 wherein the actuator is further configured to rotate the trimming ring about the axis of rotation.

12. The device of claim 10 wherein the trimming ring has a base having a surface that extends radially outward with respect to the axis of rotation from the circumference of the trimming ring.

13. The device of claim 10 wherein the fingers are formed of a flexible material.

14. The device of claim 10 wherein each of the fingers has an end disposed opposite to the base of the trimming ring and wherein a portion of the finger at the end is bent away from the axis of rotation.

15. The device of claim 10 wherein each finger has a front edge having a serrated profile.

16. The device of claim 15 wherein the serrated profile includes one or more projections.

17. The device of claim 16 wherein the one or more projections comprise one or more teeth and wherein a shape of one of the teeth is different from a shape of another one of the teeth.

* * * * *